US009076057B2

(12) United States Patent
Oda

(10) Patent No.: US 9,076,057 B2
(45) Date of Patent: Jul. 7, 2015

(54) HANDWRITTEN-INFORMATION PROCESSING APPARATUS, HANDWRITTEN-INFORMATION PROCESSING METHOD, AND NON-TRANSITORY COMPUTER-READABLE MEDIUM

(71) Applicant: FUJI XEROX CO., LTD., Minato-ku, Tokyo (JP)

(72) Inventor: Hideto Oda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 120 days.

(21) Appl. No.: 13/911,659

(22) Filed: Jun. 6, 2013

(65) Prior Publication Data

US 2014/0177961 A1 Jun. 26, 2014

(30) Foreign Application Priority Data

Dec. 20, 2012 (JP) .................................. 2012-278242

(51) Int. Cl.
*G06K 9/00* (2006.01)
*G06K 9/20* (2006.01)

(52) U.S. Cl.
CPC ................... *G06K 9/2081* (2013.01)

(58) Field of Classification Search
CPC . G06K 9/00402; G06K 9/00422; G06K 9/03; G06K 9/2054; G06K 9/222; G06K 9/72; G06F 3/03545; G06F 3/0488; G06F 3/04883; G06F 17/211; G06F 17/21; G06F 17/24; G06F 17/242; G06F 17/243; G06T 11/60
See application file for complete search history.

(56) References Cited

U.S. PATENT DOCUMENTS

| 5,276,794 | A | * | 1/1994 | Lamb, Jr. ........................ 715/202 |
| 5,459,796 | A | * | 10/1995 | Boyer ............................. 382/187 |
| 5,710,831 | A | * | 1/1998 | Beernink et al. ............... 382/189 |
| 5,850,477 | A | * | 12/1998 | Takada ........................... 382/186 |
| 6,282,315 | B1 | * | 8/2001 | Boyer ............................. 382/177 |
| 6,499,043 | B1 | * | 12/2002 | Forcier .......................... 715/273 |
| 7,561,737 | B2 | * | 7/2009 | Zou et al. ....................... 382/186 |
| 7,777,729 | B2 | * | 8/2010 | Clary ............................. 345/173 |

FOREIGN PATENT DOCUMENTS

| JP | 09-035002 A | 2/1997 |
| JP | 2005-107900 A | 4/2005 |
| JP | 2008-009833 A | 1/2008 |
| JP | 2009-048655 A | 3/2009 |
| JP | 2009-230719 A | 10/2009 |

* cited by examiner

*Primary Examiner* — Jose Couso
(74) *Attorney, Agent, or Firm* — Sughrue Mion, PLLC

(57) ABSTRACT

A handwritten-information processing apparatus includes a handwritten-information acquisition unit and a handwritten-information insertion unit. The handwritten-information acquisition unit acquires a handwritten information item which has been handwritten by a user on a medium having a region inside a writing frame and a region outside the writing frame. The region inside the writing frame includes division regions. The region outside the writing frame is located outside the region inside the writing frame. When the handwritten-information acquisition unit has acquired an insertion mark which is a handwritten information item extending across a boundary between the region inside the writing frame and the region outside the writing frame, the handwritten-information insertion unit inserts, on the basis of the insertion mark, into the region inside the writing frame, a handwritten information item which has been handwritten in the region outside the writing frame.

13 Claims, 12 Drawing Sheets

| Item Name | Quantity | Sum |
|---|---|---|
| Vernier Caliper 600mm | 1 | 7~~###~~0 |
| Spring Balance | 3 | 4~~###~~0 |
|  |  |  |
|  |  |  |
|  |  |  |
|  |  |  | c → 48   5b ← d
a →           ← b

FIG. 10

| STROKE NO. | STROKE | CLASSIFICATION |
|---|---|---|
| 0 | 3 | STROKE FOR USE IN CHARACTER INSIDE WRITING FRAME |
| 1 | 0 | STROKE FOR USE IN CHARACTER INSIDE WRITING FRAME |
| 2 | 5 | STROKE FOR USE IN CHARACTER OUTSIDE WRITING FRAME |
| 3 | — | STROKE FOR USE IN CHARACTER OUTSIDE WRITING FRAME |
| 4 | 6 | STROKE FOR USE IN CHARACTER OUTSIDE WRITING FRAME |
| 5 | / | STROKE FOR USE IN INSERTION MARK |
| 6 | — | STROKE FOR USE IN COMBINING MARK |

FIG. 11

| STROKE NO. | HANDWRITTEN INFORMATION ITEM | CLASSIFICATION |
|---|---|---|
| 0 - 1 | 3  0 | CHARACTER INSIDE WRITING FRAME |
| 2 - 4 | 56 | CHARACTER OUTSIDE WRITING FRAME |
| 5 | / | INSERTION MARK |
| 6 | — | COMBINING MARK |

FIG. 13

| Sum |
|---|
| 360 |

| Sum |
|---|
| 300 |

HANDWRITTEN-INFORMATION PROCESSING APPARATUS, HANDWRITTEN-INFORMATION PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2012-278242 filed Dec. 20, 2012.

BACKGROUND

Technical Field

The present invention relates to a handwritten-information processing apparatus, a handwritten-information processing method, and a non-transitory computer-readable medium.

SUMMARY

According to an aspect of the invention, there is provided a handwritten-information processing apparatus including a handwritten-information acquisition unit and a handwritten-information insertion unit. The handwritten-information acquisition unit acquires a handwritten information item which has been handwritten by a user on a medium having a region inside a writing frame and a region outside the writing frame. The region inside the writing frame is a region including multiple division regions. The region outside the writing frame is a region that is located outside the region inside the writing frame. When the handwritten-information acquisition unit has acquired an insertion mark which is a handwritten information item extending across a boundary between the region inside the writing frame and the region outside the writing frame, the handwritten-information insertion unit inserts, on the basis of the insertion mark, into the region inside the writing frame, a handwritten information item which has been handwritten in the region outside the writing frame.

BRIEF DESCRIPTION OF THE DRAWINGS

An exemplary embodiment of the present invention will be described in detail based on the following figures, wherein:

FIG. 10 is a diagram illustrating an example of a stroke classification table;

FIG. 11 is a diagram illustrating an example of a handwritten-information classification table;

FIG. 13 is a diagram illustrating a character inside a writing frame into which a character outside the writing frame is inserted;

FIG. 14 is a diagram illustrating examples of handwritten information items.

DETAILED DESCRIPTION

Figure 1:
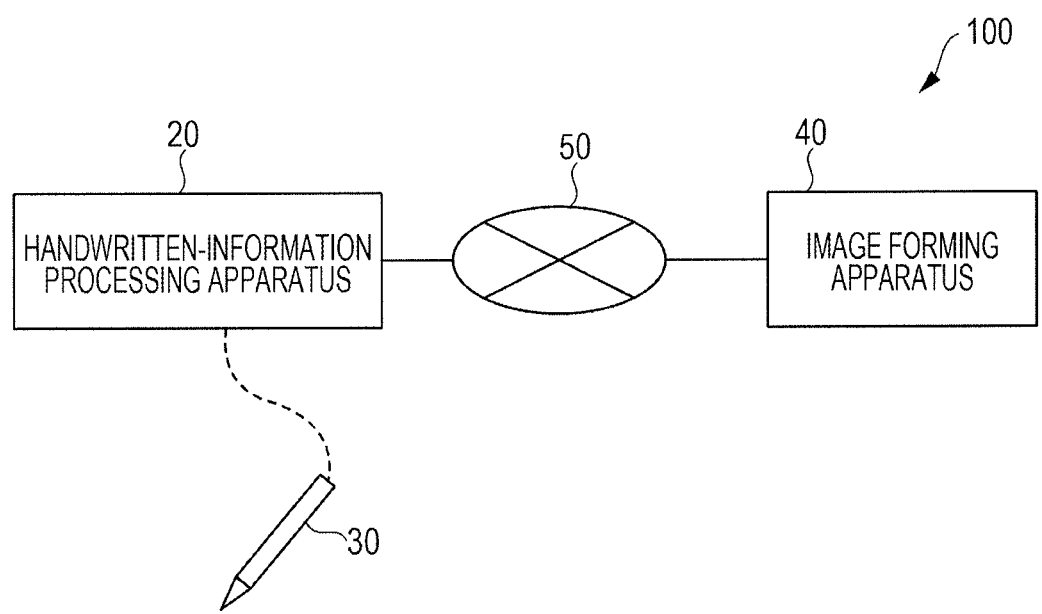
FIG. 1 is a diagram illustrating an overall configuration of a handwritten-information processing system.

An exemplary embodiment of the present invention will be described below with reference to the drawings. FIG. 1 is a diagram illustrating an overall configuration of a handwritten-information processing system 100 according to the exemplary embodiment of the present invention. The handwritten-information processing system 100 includes a handwritten-information processing apparatus 20, an electronic writing instrument 30, and an image forming apparatus 40.

The handwritten-information processing apparatus 20 is configured using a personal computer (PC), and stores a program which realizes an operating system and an application program. The handwritten-information processing apparatus 20 performs communication with the image forming apparatus 40 via a network 50 such as a local area network (LAN). The handwritten-information processing apparatus 20 acquires, using wireless communication, an information item concerning, for example, a handwritten character or mark (hereinafter, also referred to as a "handwritten information item") from the electronic writing instrument 30. Note that the handwritten-information processing apparatus 20 may be configured to acquire an information item from the electronic writing instrument 30 via the network 50. Alternatively, the handwritten-information processing apparatus 20 may have a connector conforming to the Universal Serial Bus (USB) standard, and may be configured to acquire a handwritten information item from the electronic writing instrument 30 connected to this connector.

The image forming apparatus 40 forms, using an electrophotographic system, an image on a recording medium. Hereinafter, the image forming apparatus 40 will be described using paper as an example of the recording medium. The image forming apparatus 40 performs communication with the handwritten-information processing apparatus 20 via the network 50, and forms an image on a sheet of paper on the basis of an information item transmitted from the handwritten-information processing apparatus 20. In the present exemplary embodiment, a configuration in which an image is formed on a sheet of paper using the electrophotographic system is provided as an example of the configuration of the image forming apparatus 40. However, the system for forming an image is not limited to the electrophotographic system, and may be another system.

The electronic writing instrument 30 is a writing device that is used to additionally write, in ink or the like, a character, a figure, or the like on a sheet of paper on which an image has been formed by the image forming apparatus 40. The electronic writing instrument 30 has a function of performing communication with the handwritten-information processing apparatus 20, a function of reading an information item (a handwritten information item) that has been handwritten by a user on a sheet of paper and storing the read handwritten information item, a function of transmitting the stored handwritten information item to the handwritten-information processing apparatus 20, and so forth. In other words, the electronic writing instrument 30 has a function of serving as a so-called electronic pencil (also called a digital pencil).

Overall Configuration of Handwritten-Information Processing Apparatus 20

Figure 2:
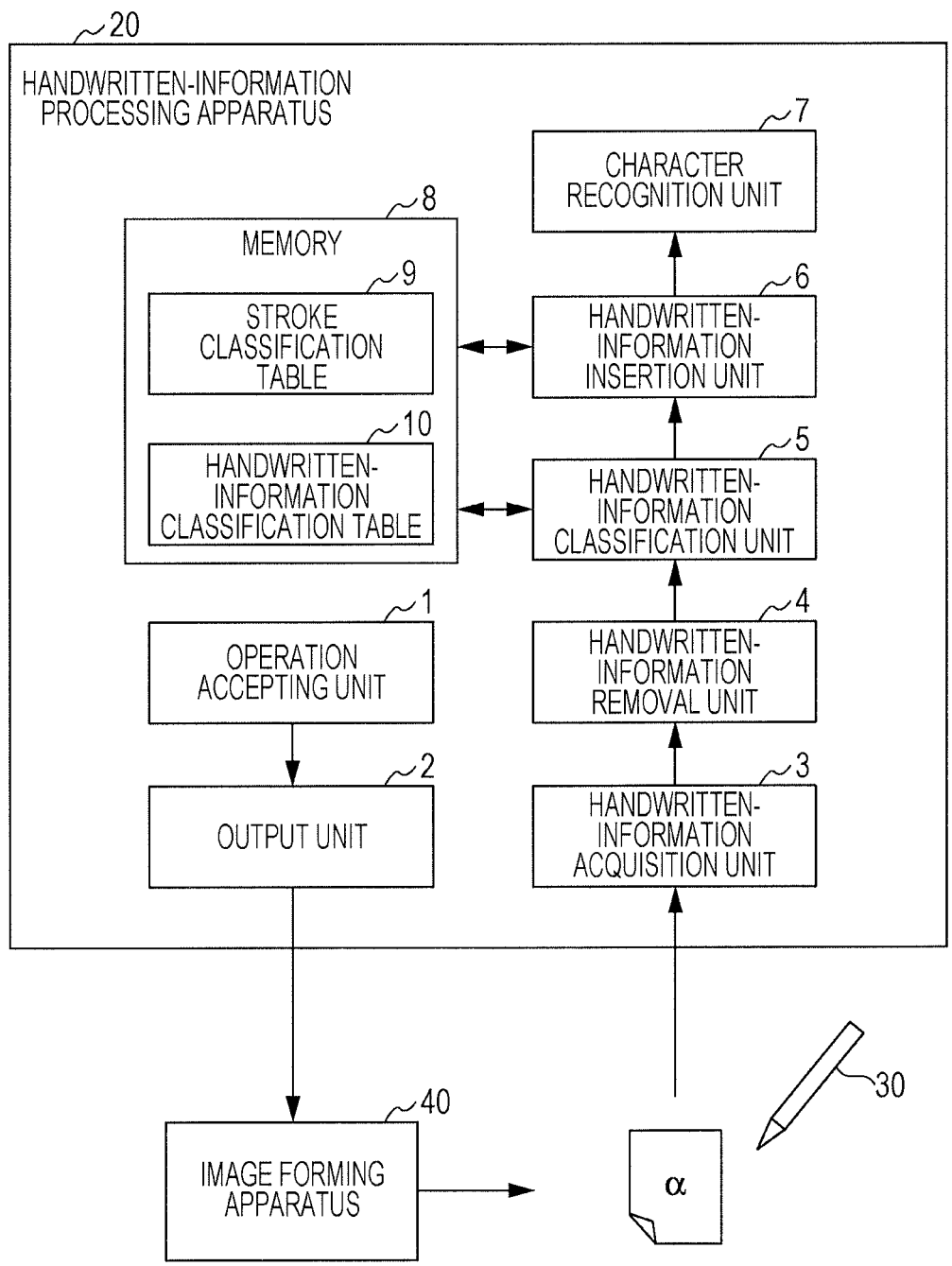
FIG. 2 is a block diagram illustrating an overall configuration of a handwritten-information processing apparatus.

FIG. 2 is a block diagram illustrating an overall configuration of the handwritten-information processing apparatus 20. As illustrated in FIG. 2, the handwritten-information processing apparatus 20 includes, an operation accepting unit 1, an output unit 2, a handwritten-information acquisition unit 3, a handwritten-information removal unit 4, a handwritten-information classification unit 5, a handwritten-information insertion unit 6, a character recognition unit 7, and a memory 8.

Regarding the operation accepting unit 1, the user operates an operation terminal (not illustrated), such as a keyboard or mouse, thereby providing an instruction for the handwritten-information processing apparatus 20, and the operation accepting unit 1 accepts the instruction. The user operates the operation terminal, whereby various types of instructions or information items are input to the handwritten-information processing apparatus 20 and various types of settings are set for the handwritten-information processing apparatus 20. For example, the user operates the mouse so as to select a desired form data item among multiple form data items (electronic documents) that are displayed on a display unit (not illustrated). The operation accepting unit 1 accepts, from the mouse, an instruction indicating that the user has selected a desired form data item. The form data item is, for example, a document data item such as an excel data item or word data item.

The output unit 2 instructs the image forming apparatus 40 to form an image represented by the form data item. Furthermore, the output unit 2 generates a code image that is to be formed on a sheet of paper. The code image is, for example, an image which is obtained by imaging a code pattern that is disclosed in Japanese Unexamined Patent Application Publication No. 2008-9833, and which is formed in a matrix of multiple rows and columns on the entire surface of a sheet of paper. One code image is formed using multiple dots that are two-dimensionally arranged. In the one code image, digital codes of a page identification (ID) of a paper document, a position information item indicating coordinates at which the code image is placed on the surface of the sheet of paper, and so forth are embedded. Note that it is possible to identify, by a page ID, a page that is being worked on, and it is possible to identify, by a page ID, an electronic document including a page that is being worked on. Furthermore, if the code image is an image in which multiple dots are two-dimensionally arranged, the code image is not limited to the code image disclosed in Japanese Unexamined Patent Application Publication No. 2008-9833. For example, the code image may be another code image using Data Matrix, Code One, Maxi Code, QR code (registered trademark), or the like. Additionally, if the dots of the code image are regularly arranged on the entire surface of a sheet of paper, arrangement of the dots in the code image is not limited to arrangement in a matrix of multiple rows and columns, and may be another arrangement.

The output unit 2 superimposes the code image, in a matrix of multiple rows and columns, on an image represented by the form data item, and generates an image data item representing the image on which the code image has been superimposed. The output unit 2 transmits the generated image data item to the image forming apparatus 40.

The handwritten-information acquisition unit 3 acquires a handwritten information item (an additional written information item) from the electronic writing instrument 30. More specifically, the handwritten-information acquisition unit 3 acquires, from the electronic writing instrument 30, a page ID and a position information item concerning the positions (coordinates) of lines (strokes) that make up a handwritten information item.

When the user writes, for example, a preset mark, such as double lines, in such a manner as to superimpose the mark on a handwritten information item, the handwritten-information removal unit 4 removes the original handwritten information item. The method for removing a handwritten information item is not limited thereto, and a well-known method may be applied.

The handwritten-information classification unit 5 classifies a handwritten information item, such as a character or a mark, which has been handwritten by the user, as one of a "character inside a writing frame", a "character outside the writing frame", an "insertion mark", a "combining mark", and an "out-of-classification information item". Furthermore, the handwritten-information classification unit 5 classifies each stroke that makes up a handwritten information item as one of a "stroke for use in a character inside the writing frame", a "stroke for use in a character outside the writing frame", a "stroke for use in an insertion mark", a "stroke for use in a combining mark", and an "out-of-classification stroke". A specific configuration of the handwritten-information classification unit 5 will be described below.

The handwritten-information insertion unit 6 inserts, on a basis of a result of classification performed by the handwritten-information classification unit 5, a handwritten information item at a position specified by the user. A specific configuration of the handwritten-information insertion unit 6 will be described below.

The character recognition unit 7 recognizes, as a text data item, a handwritten information item into which a handwritten information item has been inserted by the handwritten-information insertion unit 6. As the method for recognizing a handwritten information item, a well-known method may be applied.

The memory 8 includes a stroke classification table 9 and a handwritten-information classification table 10. In the stroke classification table 9, for each stroke that makes up a handwritten information item, an information item as which the stroke has been classified by the handwritten-information classification unit 5 is stored. More specifically, in the stroke classification table 9, each stroke that makes up a handwritten information item is associated with one of a "stroke for use in a character inside the writing frame", a "stroke for use in a character outside the writing frame", a "stroke for use in an insertion mark", a "stroke for use in a combining mark", and an "out-of-classification stroke".

With the configurations of the above-described individual units of the handwritten-information processing apparatus 20, a handwritten information item (an additional written information item) that has been handwritten by the user on a printed form (sheet) is inserted at a position desired by the user, and is reflected (written), as a text data item, in a form data item.

Configuration of Electronic Writing Instrument 30

Figures 3, 4:
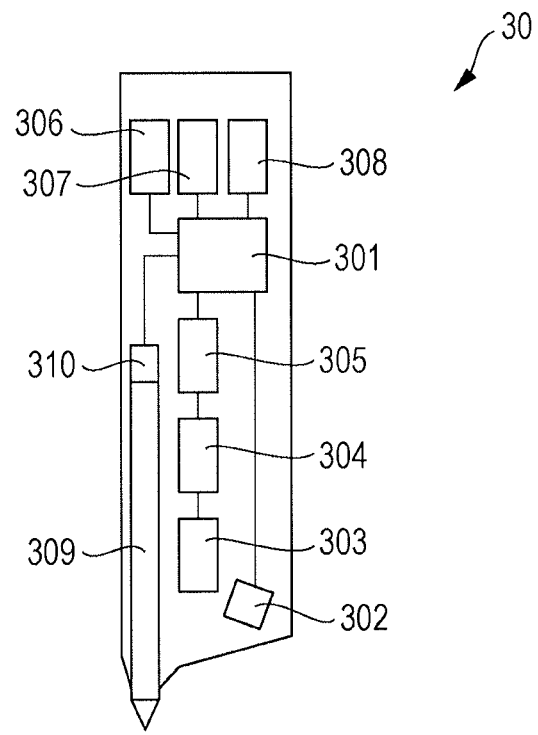
FIG. 3 is a block diagram illustrating an overall configuration of an electronic writing instrument.
FIG. 4 is a diagram illustrating examples of handwritten information items.

FIG. 3 is a block diagram illustrating an overall configuration of the electronic writing instrument 30. A well-known electronic pencil may be applied as the electronic writing instrument 30. Here, an example of a configuration of the electronic pencil will be described.

A controller 301 includes a microcomputer having a central processing unit (CPU), a read-only memory (ROM), and a random-access memory (RAM), and controls individual units of the electronic writing instrument 30. A core 309 is an example of an additionally writing unit that additionally writes a character, a figure, or the like on a sheet of paper. The core 309 has ink, and supplies the ink from the tip thereof to a sheet of paper. A pressure sensor 310 is placed so as to be in contact with the end of the core 309. When the core 309 contacts a sheet of paper, a force is exerted on the pressure sensor 310 from the end of the core 309. When the pressure sensor 310 detects that a force has been exerted, the pressure sensor 310 outputs, to the controller 301, a signal indicating that a force has been exerted.

A light emitting unit 302 has a light emitting diode that emits infrared light, and irradiates the surface of a sheet of paper with the infrared light. The light emitting unit 302 is connected to the controller 301, and whether the light emitting unit 302 emits or does not emit infrared light is controlled by the controller 301.

An image acquisition unit 303 includes a complementary metal oxide semiconductor (CMOS) image sensor, and a lens that guides, to the CMOS image sensor, light that has been emitted from the light emitting unit 302 and that has been reflected by the surface of the sheet of paper. The CMOS image sensor converts, into an electric signal, infrared light that has been reflected in the vicinity of the tip of the core 309 and that has been guided by the lens, and outputs, to the image processing unit 304, a signal representing an image formed on the surface of the sheet of paper.

The image processing unit 304 performs image processing on an image represented by the signal output from the image acquisition unit 303, and detects a code image from the image that has been subjected to image processing. Furthermore, the image processing unit 304 outputs, to the data processing unit 305, a digital data item representing the detected code image.

Here, a code image is acquired from a recording medium by the image acquisition unit 303 and the image processing unit 304. Thus, the image acquisition unit 303 and the image processing unit 304 may be considered as an image acquisition unit that acquires a code image formed on a recording medium.

A data processing unit 305 is an example of a decoding unit that decodes a code image. The data processing unit 305 performs a decoding process on the code image represented by the digital data item that has been output from the image processing unit 304, and acquires a page ID and a position information item that are included in the code image. Additionally, the data processing unit 305 is connected to the controller 301, and outputs the page ID and the position information item, which have been acquired, to the controller 301.

A communication unit 306 is connected to the controller 301. The communication unit 306 performs wireless communication with the handwritten-information processing apparatus 20, whereby an information item output from the controller 301 is transmitted to the handwritten-information processing apparatus 20. Note that the communication unit 306 may perform communication with the handwritten-information processing apparatus 20 via the network 50, whereby the information item may be transmitted to the handwritten-information processing apparatus 20. Alternatively, the communication unit 306 may perform communication with the handwritten-information processing apparatus 20 via the USB connector, whereby the information item may be transmitted to the handwritten-information processing apparatus 20.

A nonvolatile memory 307 is connected to the controller 301, and is accessed from the controller 301. The nonvolatile memory 307 stores, as an information item (a stroke information item) indicating lines that have been additionally written by the electronic writing instrument 30, the page ID and the position information item that have been transmitted from the controller 301.

A power supply unit 308 includes a secondary battery, and supplies power to the individual units of the electronic writing instrument 30.

Specific Configuration of Handwritten-Information Classification Unit 5

A specific configuration of the handwritten-information classification unit 5 will be described. FIG. 4 illustrates examples of handwritten information items. Here, a case where the form data item is an excel data item is described. A table illustrated in FIG. 4 includes multiple division regions, and the peripheries of the division regions are surrounded by ruled lines. Each of the division regions corresponds to a cell for an excel data item, and is a writing region in which the user handwrites a character or mark inside the form.

In FIG. 4, the ruled lines representing an outer frame (a bounding rectangle represented by thick lines) that is the outermost portion of the table are considered as a boarder. The inside of the outer frame is referred to as a "region inside the writing frame", and the outside of the outer frame is referred to as a "region outside the writing frame". Furthermore, a character that has been handwritten by the user in one of the division regions which are placed in the region inside the writing frame is referred to as a "character inside the writing frame". A character that has been handwritten by the user in the region outside the writing frame is referred to as a "character outside the writing frame". In FIG. 4, handwritten information items "vernier caliper 600 mm", "spring balance", "1", "3", "3 0", and "4 0" are "characters inside the writing frame". Handwritten information items "48" and "56" are "characters outside the writing frame". Note that each of the "characters inside the writing frame" and the "characters outside the writing frame" is not limited to a number, and may be a hiragana character (in the Japanese cursive syllabary), a Chinese character, an alphabetical character, or a mark. Moreover, in FIG. 4, a state in which double lines are superimposed on handwritten information items "3000" and "4000" is illustrated. However, because the characters "00" on which the double lines are superimposed are removed by the handwritten-information removal unit 4, the handwritten information items "3 0" and "4 0" are "characters inside the writing frame".

An "insertion mark" is a mark indicating a position at which a handwritten information item (an additional written information item) is to be inserted, and is made up of one stroke that extends across the boundary (the bounding rectangle represented by the thick lines illustrated in FIG. 4) between the region inside the writing frame and the region outside the writing frame. In other words, an "insertion mark" is made up of one stroke having two endpoints, and one of the two endpoints is located in the region inside the writing frame and the other endpoint is located in the region outside the writing frame. In FIG. 4, handwritten information items "sign a" and "sign b" are "insertion marks".

A "combining mark" is a mark for combing (grouping) multiple strokes that are located in the region outside the writing frame together as one character (a character outside the writing frame). A "combining mark" is a stroke having points that are all located in the region outside the writing frame among strokes having certain lengths. In FIG. 4, handwritten information items "sign c" and "sign d" are "combining marks".

Next, a specific method for classifying a handwritten information item as one of a "character inside the writing frame", a "character outside the writing frame", an "insertion mark", a "combining mark", and an "out-of-classification information item" will be described.

Figure 5:
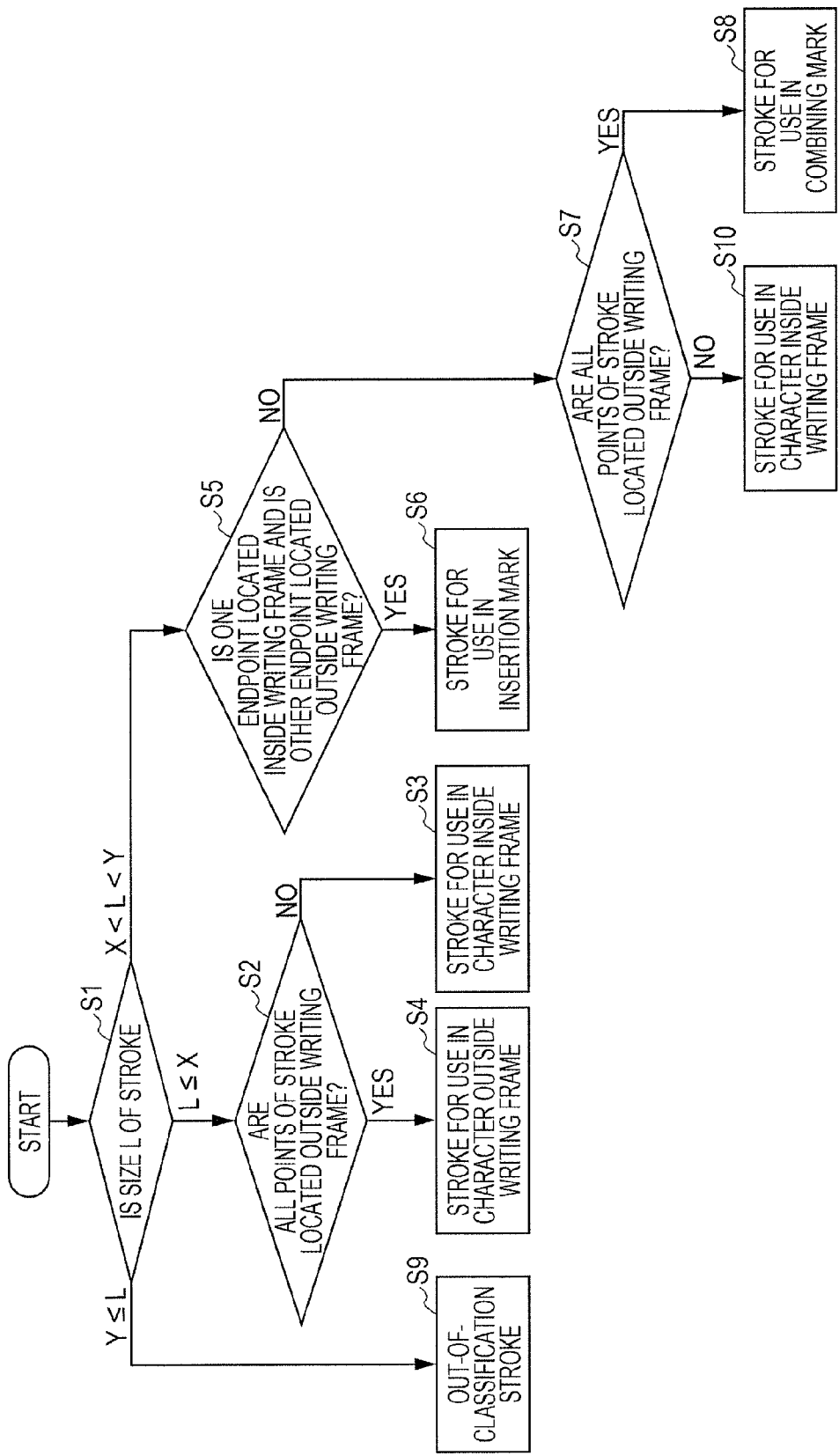
FIG. 5 is a flowchart illustrating an example of a stroke classification process.
Figure 6:
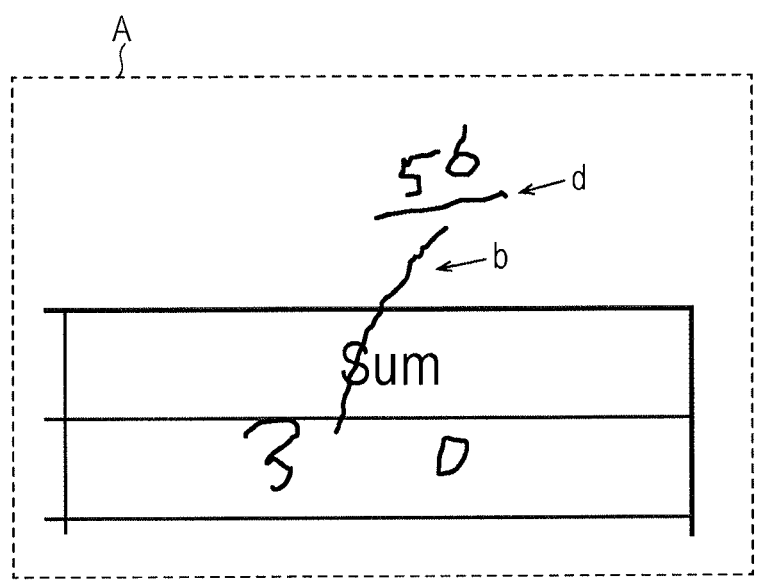
FIG. 6 is a partial enlarged view of FIG. 4.

First, the handwritten-information classification unit 5 performs a stroke classification process of classifying each stroke that makes up a handwritten information item as one of a "stroke for use in a character inside the writing frame", a "stroke for use in a character outside the writing frame", a "stroke for use in an insertion mark", a "stroke for use in a combining mark", and an "out-of-classification stroke". FIG. 5 is a flowchart illustrating an example of the stroke classification process. Hereinafter, the flow of the stroke classification process will be described using the handwritten information item "3 0", which is provided in a sum column illustrated in FIG. 4, the handwritten information item "56", which is located in the region outside the writing frame, and the handwritten information items "sign b" and "sign d" as examples. Note that a partial enlarged view of FIG. 4 is FIG. 6. In FIG. 6, a state in which the character "00" has been removed by the handwritten-information removal unit 4 is illustrated.

Here, the handwritten information item "3 0" is made up of two strokes. The two strokes are numbered in the chronological order in which the strokes are written by the user. "3" is a stroke whose stroke number is 0, and "0" is a stroke whose stroke number is 1. The handwritten information item "56" is made up of three strokes. The first stroke of "5" is a stroke whose stroke number is 2, the second stroke of "5" is a stroke whose stroke number is 3, and "6" is a stroke whose stroke number is 4. Each of the handwritten information items "sign b" and "sign d" is made up of one stroke. "sign b" is a stroke whose stroke number is 5, and "sign d" is a stroke whose stroke number is 6.

In Case of Stroke "3" Whose Stroke Number is 0

Figure 7A:
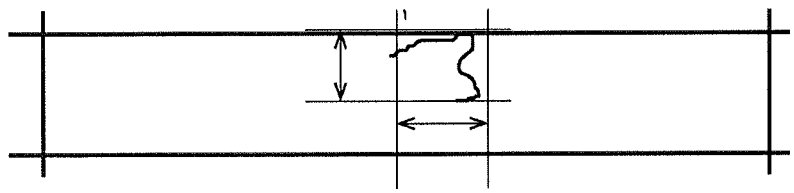
FIGS. 7A to 7C are diagrams illustrating examples of a set value that is to be compared with the size of a stroke.
Figure 7B:
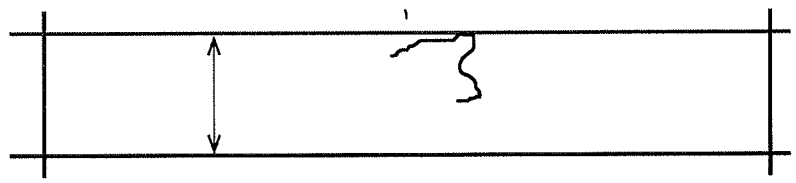
Figure 7C:
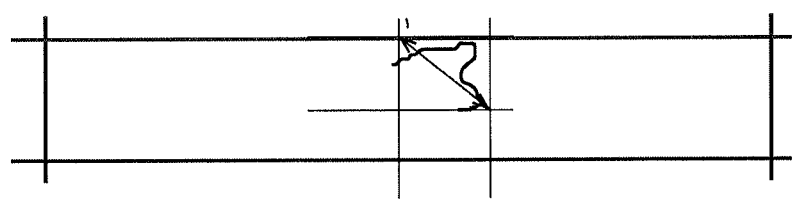

First, in step 1 (hereinafter, referred to as "S1"), the handwritten-information classification unit 5 determines a size L of a stroke is equal to or smaller than X (L≤X), larger than X and smaller than Y (X<L<Y), or equal to or larger than Y (Y≤L). X and Y are set in advance on the basis of, for example, the height of each of the division regions, the height and width of the bounding rectangle of a stroke, or the length of a stroke. More specifically, for example, between the height and width of the bounding rectangle of a stroke that has been handwritten in one of the division regions, the average value of a larger one (or smaller one) is set as X (FIG. 7A). Alternatively, the average value of the height of each of the division regions (FIG. 7B) or the length of a diagonal line of the bounding rectangle of a stroke (FIG. 7C) may be set as X. Additionally, Y may be set to be a value that is difficult to be used as a dimension of an insertion mark or combining mark, for example, the height or width of the bounding rectangle (the thick lines illustrated in FIG. 4) of the region inside the writing frame.

Here, because the relationship L≤X is satisfied for the stroke "3" whose stroke number is 0, the process proceeds to step S2. In step S2, the handwritten-information classification unit 5 determines whether or not all points of the stroke are located in the region outside the writing frame. Because all points of the stroke "3" are not located in the region outside the writing frame (NO in step S2), the handwritten-information classification unit 5 determines the stroke "3" as a stroke for use in a character inside the writing frame (step S3).

Similarly, the handwritten-information classification unit 5 determines the stroke "0" whose stroke number is 1 as a stroke for use in a character inside the writing frame.

In Case of First Stroke of "5" Whose Stroke Number is 2

The relationship L≤X is satisfied for the first stroke of "5" whose stroke number is 2, and all points of the first stroke of "5" are located in the region outside the writing frame (YES in step S2). Thus, the handwritten-information classification unit 5 determines the first stroke of "5" as a stroke for use in a character outside the writing frame (step S4).

Similarly, the handwritten-information classification unit 5 determines the second stroke of "5" whose stroke number is 3 and the stroke "6" whose stroke number is 4 as strokes for use in a character outside the writing frame.

In Case of Stroke "Sign b" Whose Stroke Number is 5

Figure 8:
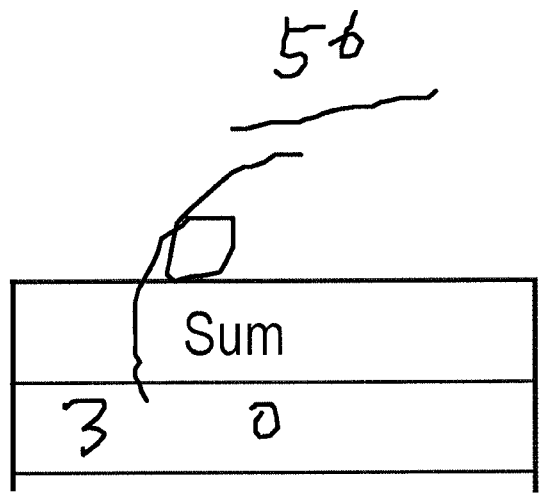
FIG. 8 is a diagram illustrating an example of a stroke for use in an insertion mark.

Because the relationship X<L<Y is satisfied for the stroke "sign b" whose stroke number is 5, the process proceeds to step S5. In step S5, the handwritten-information classification unit 5 determines whether or not one of two endpoints of the stroke is located in the region inside the writing frame and the other endpoint is located in the region outside the writing frame. One of two endpoints of the stroke "sign b" is located in the region inside the writing frame and the other endpoint is located in the region outside the writing frame (YES in step S5). Thus, the handwritten-information classification unit 5 determines the stroke "sign b" as a stroke for use in an insertion mark (step S6). Note that, in order to increase the identification accuracy with which a stroke for use in an insertion mark is identified, further, the shape of a stroke for use in an insertion mark may be defined. For example, as illustrated in FIG. 8, a stroke having a spiral-shaped portion may be defined as a stroke for use in an insertion mark.

In Case of Stroke "Sign d" Whose Stroke Number is 6

Figure 9:
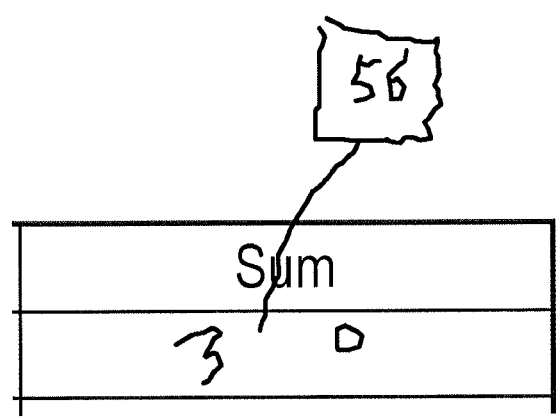
FIG. 9 is a diagram illustrating an example of a stroke for use in a combining mark.

Because the relationship X<L<Y is satisfied for the stroke "sign d" whose stroke number is 6 and all points of the stroke are located in the region outside the writing frame (NO in step S5), the process proceeds to step S7. In step S7, the handwritten-information classification unit 5 determines whether or not all points of the stroke are located in the region outside the writing frame (step S7). Because all points of the stroke "sign d" are located in the region outside the writing frame (YES in step S7), the handwritten-information classification unit 5 determines the stroke "sign d" as a stroke for use in a combining mark (step S8). Note that, in order to increase the identification accuracy with which a stroke for use in a combining mark is identified, further, the shape of a stroke for use in a combining mark may be defined. For example, as illustrated in FIG. 9, a rectangular stroke may be defined as a stroke for use in a combining mark. Alternatively, ( ) or " " may be defined as strokes for use in a combining mark.

Note that, in step S1, in the case where the size L of the stroke is equal to or larger than Y (Y≤L), the handwritten-information classification unit 5 determines the stroke as an out-of-classification stroke (step S9). Moreover, in step S7, in the case where all points of the stroke are not located in the region outside the writing frame (NO in step S7), the handwritten-information classification unit 5 determines the stroke as a stroke for use in a character inside the writing frame (step S10).

The handwritten-information classification unit 5 stores, in the stroke classification table 9 illustrated in FIG. 10, stroke information items as which the strokes have been classified by the above-described stroke classification process.

Next, the handwritten-information classification unit 5 performs a process (a handwritten-information classification process) of classifying, on the basis of the stroke classification table 9, which is illustrated in FIG. 10, and on the basis of the position information items, which have been acquired from the electronic writing instrument 30, concerning the positions (coordinates) of strokes, each of the handwritten information items as one of a "character inside the writing frame", a "character outside the writing frame", an "insertion mark", a "combining mark", and an "out-of-classification information item". For example, both of the strokes whose stroke numbers are 0 and 1 are strokes for use in a character inside the writing frame, and are located in the same division region among the division regions. Thus, the handwritten information item made up of the strokes whose stroke numbers are 0 and 1 indicates one character (character string) "3 0", and is classified as a "character inside the writing frame". Both of the strokes whose stroke numbers are 2 to 4 are strokes for use in a character outside the writing frame, and the individual positions (coordinates) of the strokes whose stroke numbers are 2 to 4 are close to each other. Thus, the handwritten information item made up of the strokes whose stroke numbers are 2 to 4 indicates one character "56", and is classified as a "character outside the writing frame". The strokes whose stroke numbers are 5 and 6 are different strokes, i.e., a stroke for use in an insertion mark and a stroke for use in a combining mark, respectively, and each of the handwritten information items made up of the strokes whose stroke numbers are 5 and 6 is made up of one stroke. Thus, the handwritten information items made up of the strokes whose stroke numbers are 5 and 6 are classified as an insertion mark and a combining mark, respectively.

Note that a handwritten information item made up of two strokes (for example, ( ) or " ") that are located so as to face each other in the region outside the writing frame and that have a symmetric shape is classified as a combining mark.

As another method for recognizing a character made up of one or multiple strokes as one character (character string), a method using an insertion mark or combining mark may be used. For example, one or multiple strokes that are located in the vicinity of one of two endpoints of a stroke making up an insertion mark or in the vicinity of a combining mark may be recognized as one character. Furthermore, in the case of recognizing a "character outside the writing frame", the handwritten-information classification unit 5 may utilize a combining mark because the division regions are not usable.

The handwritten-information classification unit 5 stores, in the handwritten-information classification table 10 illustrated in FIG. 11, classification information items as which the handwritten information items have been classified by the above-described handwritten-information classification process.

Specific Configuration of Handwritten-Information Insertion Unit 6

Figure 12:
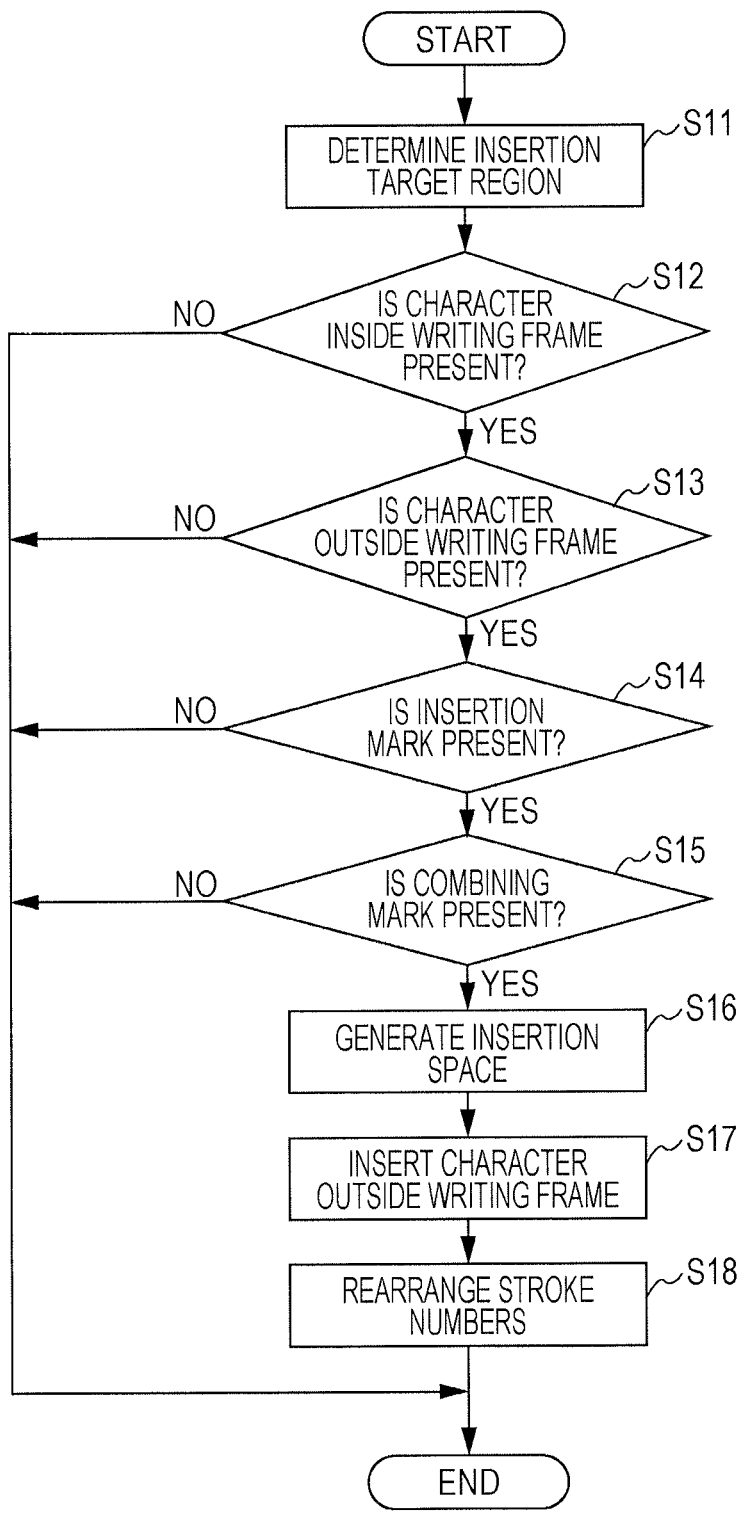
FIG. 12 is a flowchart illustrating an example of a handwritten-information insertion process.

A specific configuration of the handwritten-information insertion unit 6 will be described. The handwritten-information insertion unit 6 inserts a handwritten information item at a position specified by the user, on the basis of a result of classification performed by the handwritten-information classification unit 5. FIG. 12 is a flowchart illustrating an example of a handwritten-information insertion process.

First, the handwritten-information insertion unit 6 determines a region (an insertion target region) into which a handwritten information item (an additional written information item) is to be inserted (step S11). For example, the handwritten-information insertion unit 6 determines a peripheral region including an insertion mark as an insertion target region. More specifically, the handwritten-information insertion unit 6 determines, as an insertion target region A, a frame represented by dotted lines illustrated in FIG. 6.

Next, the handwritten-information insertion unit 6 determines, on an insertion-target-region-by-insertion-target-region basis, whether or not a "character inside the writing frame", a "character outside the writing frame", an "insertion mark", and a "combining mark" are present (steps S12 to S15). For example, the handwritten-information insertion unit 6 performs the processes of steps S12 to S15 with reference to the handwritten-information classification table 10 (FIG. 11) corresponding to the handwritten information items included in the insertion target region A. In the case where all of a "character inside the writing frame", a "character outside the writing frame", an "insertion mark", and a "combining mark" are present, the process proceeds to step S16. In the case where at least one of a "character inside the writing frame", a "character outside the writing frame", an "insertion mark", and a "combining mark" is not present, the process finishes.

In the case where all of a "character inside the writing frame", a "character outside the writing frame", an "insertion mark", and a "combining mark" are present (YES in step S15), the handwritten-information insertion unit 6 generates an insertion space that is used to insert the character outside the writing frame at a certain position in the character inside the writing frame (step S16). Note that, in the case where an insertion space has already been present, the process of step S16 may be omitted. Furthermore, in the case where an insertion space is small, the handwritten-information insertion unit 6 performs a process of increasing the size of the insertion space.

Figures 13, 14:
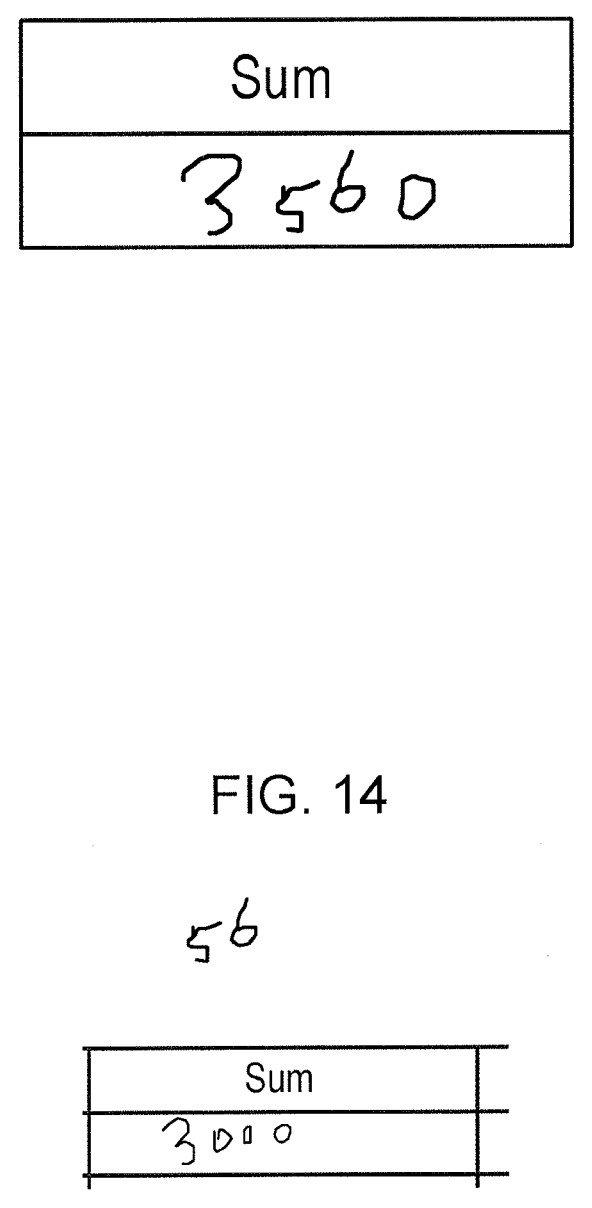

Next, the handwritten-information insertion unit 6 inserts the character outside the writing frame into the insertion space (step S17). More specifically, the handwritten-information insertion unit 6 detects, on the basis of a position information item concerning the insertion mark, the combining mark that is located in the vicinity of one endpoint which is one of two endpoints of the insertion mark and which is located in the region outside the writing frame. The handwritten-information insertion unit 6 determines, on the basis of a position information item concerning the combining mark, the character outside the writing frame that is located in the vicinity of the combining mark, as a target that is to be inserted into the character inside the writing frame. Here, the character outside the writing frame "56" is determined as a target that is to be inserted into the character inside the writing frame. The handwritten-information insertion unit 6 inserts the determined character outside the writing frame "56" into the insertion space of the character inside the writing frame. FIG. 13 illustrates a state in which the character outside the writing frame "56" is inserted into the character inside the writing frame.

Finally, for the character inside the writing frame into which the character outside the writing frame has been inserted (FIG. 13), the handwritten-information insertion unit 6 rearranges the stroke numbers on the basis of the position information items. More specifically, in step S17, the handwritten-information insertion unit 6 performs a process of appropriately rearranging the chronological order of the strokes in a state in which the character outside the writing frame is inserted into the character inside the writing frame. For example, in step S17, at a stage at which the character outside the writing frame is inserted into the character inside the writing frame, the characters are arranged and displayed in the order of "3560". However, when the stroke numbers are arranged in accordance with the order of the characters, the order of the stroke numbers is "0, 2, 3, 4, and 1". For this reason, in this state, when a character recognition process is performed by the character recognition unit 7, the character inside the writing frame may be recognized as "3056". In order to prevent a character inside the writing frame from being incorrectly recognized as mentioned above, the handwritten-information insertion unit 6 performs a process of rearranging stroke numbers so that the chronological order of the stroke numbers matches the order of the displayed characters. In other words, the handwritten-information insertion unit 6 rearranges the stroke numbers of the strokes so that the stroke number of the stroke "3" is 0, the stroke numbers of the strokes of "5" are 1 and 2, the stroke number of the stroke "6" is 3, and the stroke number of the stroke "0" is 4. Accordingly, the character recognition unit 7 is able to perform character recognition so that the handwritten information item is appropriately recognized as a text data item.

Here, as illustrated in FIG. 14, a process performed by the handwritten-information insertion unit 6 in the case where no insertion mark is present will be described. In FIG. 14, the character inside the writing frame "3000" and the character outside the writing frame "56" are present, but no insertion mark is present. Accordingly, a result of determination in step S14 illustrated in FIG. 12 is NO, and the process performed by the handwritten-information insertion unit 6 finishes. In other words, the handwritten-information insertion process is not performed. In this manner, in the case where the user does not intend to insert the character outside the writing frame "56" into the character inside the writing frame "3000", it is possible to prevent the handwritten-information insertion process from being incorrectly performed.

Figure 15:
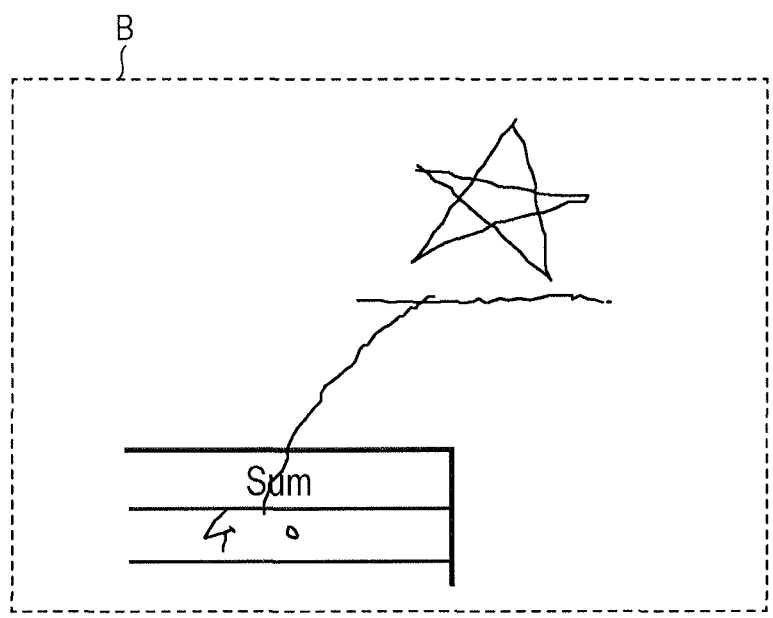
FIG. 15 is a diagram illustrating examples of handwritten information items.

Because an insertion mark is present in FIG. 15, a peripheral region including the insertion mark is determined as an insertion target region B. In the insertion target region B, the size of a stroke making up a handwritten information item "☆" that has been handwritten in the region outside the writing frame is equal to or larger than Y (Y≤L). Accordingly, the stroke is classified as an out-of-classification information item through the process, which is performed by the handwritten-information classification unit 5, of step S1 illustrated in FIG. 5. Thus, the handwritten information item "☆" is classified as not a character outside the writing frame but an out-of-classification information item. Accordingly, a result of determination in step S13 illustrated in FIG. 12 is NO, and the process performed by the handwritten-information insertion unit 6 finishes. In other words, the handwritten-information insertion process is not performed.

Modification Example

The above-described handwritten-information processing apparatus 20 has a configuration in which a character outside the writing frame that has been additionally written by the user is inserted into a character inside the writing frame that has been handwritten in one of the division regions. However, the handwritten-information processing apparatus 20 according to the present exemplary embodiment is not limited thereto, and may have a configuration given below.

In other words, the handwritten-information processing apparatus 20 may have a configuration in which, in the case where no character inside the writing frame is present in any one of the division regions, the handwritten-information insertion unit 6 inserts a character outside the writing frame that is located in the vicinity of one endpoint which is one of two endpoints making up a stroke of an insertion mark and which is located in the region outside the writing frame, in the vicinity of the other endpoint which is one of the two endpoints of the stroke making up the insertion mark and which is located in the region inside the writing frame. With this configuration, without performing a process of, for example, removing an original handwritten information item, it is possible to insert a character that is located in the region outside the writing frame, at a desired position in the region inside the writing frame.

Regarding the functions of the above-described individual units included in the above-described handwritten-information processing apparatus 20, a computer having a controller such as a CPU, a memory, an input/output unit that transmits/ receives a data item to/from an external device reads a program stored in a computer-readable information storage medium, and executes the program, whereby the functions may be realized. Note that the program may be supplied to the handwritten-information processing apparatus 20, which is configured using a computer, using an information storage medium, such as an optical disc, a magnetic disk, a magnetic tape, a magneto-optical disk, or a flash memory. Alternatively, the program may be supplied to the handwritten-information processing apparatus 20 via a data communication network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A handwritten-information processing apparatus comprising:
    a processor executing units comprising:
        a receiving unit that receives position information transmitted from an external device, wherein the position information indicates coordinates on a surface of a medium having a region inside a writing frame and a region outside the writing frame, the region inside the writing frame being a region including a plurality of division regions, the region outside the writing frame being a region that is located outside the region inside the writing frame;
        a handwritten-information acquisition unit that acquires a handwritten information item which has been handwritten by a user on the medium according to the position information received by the receiving unit; and
        a handwritten-information insertion unit that, when the handwritten-information acquisition unit has acquired an insertion mark which is a handwritten information item extending across a boundary between the region inside the writing frame and the region outside the writing frame, inserts, on the basis of the insertion mark, into the region inside the writing frame, a handwritten information item which has been handwritten in the region outside the writing frame,
    wherein the handwritten-information insertion unit inserts a handwritten information item that is located in the vicinity of one endpoint which is one of two endpoints of a stroke making up an insertion mark and which is located in the region outside the writing frame, into the vicinity of the other endpoint which is one of the two endpoints of the stroke making up the insertion mark and which is located in the region inside the writing frame.

2. The handwritten-information processing apparatus according to claim 1, further comprising a handwritten-information classification unit that classifies the handwritten information item which has been handwritten by the user, as one of a character inside the writing frame, a character outside the writing frame, and an insertion mark, wherein the handwritten-information classification unit,
in a case where the handwritten information item is located in one of the plurality of division regions, classifies the handwritten information item as a character inside the writing frame,
in a case where the handwritten information item is located in the region outside the writing frame, classifies the handwritten information item as a character outside the writing frame, and
in a case where one of two endpoints of a stroke making up the handwritten information item is located in the region inside the writing frame and where the other endpoint is located in the region outside the writing frame, classifies the handwritten information item as an insertion mark.

3. The handwritten-information processing apparatus according to claim 2, wherein
the handwritten-information classification unit,
in a case where the length of a stroke making up the handwritten information item is smaller than a predetermined length and where all points of the stroke are located in the region inside the writing frame, classifies the stroke as a stroke for use in a character inside the writing frame, the stroke for use in a character inside the writing frame being a stroke making up the character inside the writing frame, and
in a case where the length of a stroke making up the handwritten information item is smaller than the predetermined length and where all points of the stroke are located in the region outside the writing frame, classifies the stroke as a stroke for use in a character outside the writing frame, the stroke for use in a character outside the writing frame being a stroke making up the character outside the writing frame.

4. The handwritten-information processing apparatus according to claim 3, wherein
the handwritten-information classification unit,
in a case where a plurality of strokes for use in a character inside the writing frame are located in the same division region among the plurality of division regions, classifies a handwritten information item made up of the plurality of strokes for use in a character inside the writing frame, as one character inside the writing frame, and
in a case where the positions of a plurality of strokes for use in a character outside the writing frame are close to each other, classifies a handwritten information item made up of the plurality of strokes for use in a character outside the writing frame, as one character outside the writing frame.

5. The handwritten-information processing apparatus according to claim 2, wherein the handwritten-information insertion unit determines whether or not at least a character inside the writing frame, a character outside the writing frame, and an insertion mark are present, and, in a case where all of a character inside the writing frame, a character outside the writing frame, and an insertion mark are present, the handwritten-information insertion unit inserts, into the character inside the writing frame, the character outside the writing frame that is located in the vicinity of one endpoint which is one of two endpoints of a stroke making up the insertion mark and which is located in the region outside the writing frame.

6. The handwritten-information processing apparatus according to claim 3, wherein, in a case where two endpoints of a stroke making up the handwritten information item that has been handwritten by the user are located in the region outside the writing frame and where the length of the stroke making up the handwritten information item is smaller than a predetermined length, the handwritten-information classification unit further classifies the handwritten information item as a combining mark.

7. The handwritten-information processing apparatus according to claim 6, wherein
the handwritten-information classification unit,
in a case where the length of a stroke making up the handwritten information item is larger than the predetermined length, where one of two endpoints of the stroke is located in the region inside the writing frame, and where the other endpoint of the stroke is located in the region outside the writing frame, classifies the stroke as a stroke for use in an insertion mark, the stroke for use in an insertion mark being a stroke making up the insertion mark, and
in a case where the length of a stroke making up the handwritten information item is larger than the predetermined length and where all points of the stroke are located in the region outside the writing frame, classifies the stroke as a stroke for use in a combining mark, the stroke for use in a combining mark being a stroke making up the combining mark.

8. The handwritten-information processing apparatus according to claim 7, wherein the handwritten-information classification unit classifies one stroke for use in an insertion mark as one insertion mark, and classifies one stroke for use in a combining mark as one combining mark.

9. The handwritten-information processing apparatus according to claim 6, wherein, in a case where the position of each of a plurality of strokes for use in a character outside the writing frame is close to a combining mark, the handwritten-information classification unit classifies a handwritten information item made up of the plurality of strokes for use in a character outside the writing frame as one character outside the writing frame.

10. The handwritten-information processing apparatus according to claim 6, wherein the handwritten-information insertion unit inserts, into the region inside the writing frame, a character outside the writing frame that is located in the vicinity of a combining mark.

11. The handwritten-information processing apparatus according to claim 6, wherein the handwritten-information insertion unit determines whether or not a character inside the writing frame, a character outside the writing frame, an insertion mark, and a combining mark are present, and, in a case where all of a character inside the writing frame, a character outside the writing frame, an insertion mark, and a combining mark are present, the handwritten-information insertion unit inserts, into the character inside the writing frame, the character outside the writing frame that is located in the vicinity of the combining mark.

12. A handwritten-information processing method comprising:
receiving, using at least one processor, position information transmitted from an external device, wherein the position information indicates coordinates on a surface of a medium having a region inside a writing frame and a region outside the writing frame, the region inside the writing frame being a region including a plurality of division regions, the region outside the writing frame being a region that is located outside the region inside the writing frame;
acquiring, using the at least one processor, a handwritten information item which has been handwritten by a user on the medium according to the received position information; and inserting, using the at least one processor, when an insertion mark which is a handwritten information item extending across a boundary between the region inside the writing frame and the region outside the writing frame has been acquired, on the basis of the insertion mark, into the region inside the writing frame, a handwritten information item which has been handwritten in the region outside the writing frame, wherein a handwritten information item that is located in the vicinity of one endpoint which is one of two endpoints of a stroke making up an insertion mark and which is located in the region outside the writing frame is inserted into the vicinity of the other endpoint which is one of the two endpoints of the stroke making up the insertion mark and which is located in the region inside the writing frame.

13. A non-transitory computer-readable medium storing a program causing a computer to execute a process, the process comprising:

receiving position information transmitted from an external device, wherein the position information indicates coordinates on a surface of a medium having a region inside a writing frame and a region outside the writing frame, the region inside the writing frame being a region including a plurality of division regions, the region outside the writing frame being a region that is located outside the region inside the writing frame;

acquiring a handwritten information item which has been handwritten by a user on the medium according to the received position information; and inserting, when an insertion mark which is a handwritten information item extending across a boundary between the region inside the writing frame and the region outside the writing frame has been acquired, on the basis of the insertion mark, into the region inside the writing frame, a handwritten information item which has been handwritten in the region outside the writing frame, wherein a handwritten information item that is located in the vicinity of one endpoint which is one of two endpoints of a stroke making up an insertion mark and which is located in the region outside the writing frame is inserted into the vicinity of the other endpoint which is one of the two endpoints of the stroke making up the insertion mark and which is located in the region inside the writing frame.

* * * * *